(12) United States Patent
Choy et al.

(10) Patent No.: US 7,521,891 B2
(45) Date of Patent: Apr. 21, 2009

(54) CHARGING SYSTEM FOR RECHARGING A BATTERY OF POWERED LIFT AMBULANCE COT WITH AN ELECTRICAL SYSTEM OF AN EMERGENCY VEHICLE

(75) Inventors: Earl Choy, Cumming, GA (US); W. Dale Sutton, Sr., Wathene, KS (US); Robert Chinn, Atlanta, GA (US)

(73) Assignee: Fernon-Washington, Inc., Wilmington, OH (US)

( * ) Notice: Subject to any disclaimer, the term of this patent is extended or adjusted under 35 U.S.C. 154(b) by 368 days.

(21) Appl. No.: 11/339,972

(22) Filed: Jan. 26, 2006

(65) Prior Publication Data
US 2006/0265807 A1 Nov. 30, 2006

Related U.S. Application Data

(63) Continuation-in-part of application No. PCT/US2005/019547, filed on Jun. 3, 2005.

(60) Provisional application No. 60/579,395, filed on Jun. 14, 2004.

(51) Int. Cl.
*H01M 10/46* (2006.01)
(52) U.S. Cl. .................................... 320/114
(58) Field of Classification Search ................ 320/107, 320/114, 115; 5/600, 614, 616
See application file for complete search history.

(56) References Cited

U.S. PATENT DOCUMENTS

| | | | |
|---|---|---|---|
| 2,538,993 A | 1/1951 | Travis | |
| 2,833,587 A | 5/1958 | Saunders | |
| 3,099,020 A | 7/1963 | Garfield et al. | |
| 3,174,722 A | 3/1965 | Alm | |
| 3,203,670 A | 8/1965 | Farris | |
| 3,815,164 A | 6/1974 | Smith | |
| 4,037,871 A | 7/1977 | Bourgraf et al. | |
| 4,071,222 A | 1/1978 | Wright | |
| 4,078,269 A | 3/1978 | Weipert | |
| 4,097,941 A | 7/1978 | Merkel | |

(Continued)

FOREIGN PATENT DOCUMENTS

DE 3541017 A1 6/1986

(Continued)

*Primary Examiner*—Edward Tso
(74) *Attorney, Agent, or Firm*—Dinsmore & Shohl LLP

(57) ABSTRACT

A collapsible hydraulically operated ambulance cot having a support frame, a wheeled base, a support mechanism disposed therebetween, and a lift system for hydraulically moving the upper frame relative to the lower frame is disclosed. The lift system permits a single attendant to raise the cot from a lowered position to a raised position, and an infinite number of positions therebetween, and to raise the wheeled base relative to the support frame to situate the cot onto an elevated surface such as the transport deck of an ambulance. A manual override is also provided to conserve battery power and as a back-up in no-power situations. It is to be appreciated that the above described manual override mode may be used when raising or lowering the cot without power assist, dropping the undercarriage when unloading from a vehicle, and lifting the undercarriage when loading into a vehicle. A charging system for recharging a battery of an electro-hydraulically powered lift ambulance cot with an electrical system of an emergency vehicle is also disclosed.

19 Claims, 13 Drawing Sheets

U.S. PATENT DOCUMENTS

| | | |
|---|---|---|
| 4,271,545 A | 6/1981 | Christian, III |
| 4,352,991 A | 10/1982 | Kaufman |
| 4,556,198 A | 12/1985 | Tominaga |
| 4,558,847 A | 12/1985 | Coates |
| 4,613,122 A | 9/1986 | Manabe |
| 4,646,211 A | 2/1987 | Gallant et al. |
| 4,675,926 A | 6/1987 | Lindblom et al. |
| 4,912,787 A | 4/1990 | Bradcovich |
| 4,984,774 A | 1/1991 | Zupancic et al. |
| 5,022,105 A | 6/1991 | Catoe |
| 5,054,141 A | 10/1991 | Foster et al. |
| 5,074,000 A | 12/1991 | Soltani et al. |
| 5,083,331 A | 1/1992 | Schnelle et al. |
| 5,084,922 A | 2/1992 | Louit |
| 5,135,350 A | 8/1992 | Eelman et al. |
| 5,271,113 A | 12/1993 | White |
| 5,365,622 A | 11/1994 | Schirmer |
| 5,495,914 A | 3/1996 | DiMucci et al. |
| 5,537,700 A | 7/1996 | Way et al. |
| 5,575,026 A | 11/1996 | Way et al. |
| 5,662,627 A | 9/1997 | Say |
| 5,697,471 A | 12/1997 | DiMucci et al. |
| 5,701,618 A | 12/1997 | Brugger |
| 5,740,884 A | 4/1998 | DiMucci et al. |
| 5,983,425 A | 11/1999 | DeMucci et al. |
| 6,024,528 A | 2/2000 | Taylor |
| 6,219,864 B1 | 4/2001 | Ellis et al. |
| 6,332,638 B1 | 12/2001 | Menna |
| 6,701,545 B1 | 3/2004 | Ferneau et al. |
| 6,916,056 B2 | 7/2005 | Mitchell et al. |
| 2002/0174486 A1 | 11/2002 | Van Den Heuvel et al. |
| 2003/0037375 A1 | 2/2003 | Riley et al. |
| 2003/0079288 A1 | 5/2003 | Cook et al. |
| 2004/0055087 A1 | 3/2004 | Edgerton |
| 2004/0080172 A1 | 4/2004 | Mitchell et al. |
| 2004/0088792 A1 | 5/2004 | O'Krangley et al. |
| 2005/0035871 A1 | 2/2005 | Dixon et al. |
| 2006/0259267 A1 * | 11/2006 | Narayanasamy ............ 702/150 |

FOREIGN PATENT DOCUMENTS

| | | |
|---|---|---|
| FR | 2 786 091 A1 | 5/2000 |
| GB | 2 302 672 A | 1/1997 |
| GB | 2 351 439 | 1/2001 |
| GB | 2 368 317 A | 5/2002 |
| GB | 2 390 062 A | 12/2003 |
| WO | WO 0239944 A2 | 5/2002 |

* cited by examiner

CHARGING SYSTEM FOR RECHARGING A BATTERY OF POWERED LIFT AMBULANCE COT WITH AN ELECTRICAL SYSTEM OF AN EMERGENCY VEHICLE

CROSS-REFERENCE OF RELATED APPLICATIONS

This application is a continuation-in-part of PCT application U.S. Ser. No. 05/019,547, filed Jun. 3, 2005, which claims benefit from U.S. provisional application No. 60/579,395 filed Jun. 14, 2004 (now abandoned)), all of which are incorporated herein by reference in their entirety.

FIELD OF THE INVENTION

This invention relates to ambulance cots and more particularly to an ambulance cot having an electro-hydraulically, operated collapsible frame structure to facilitate loading of the ambulance cot from the ground and into an ambulance by a single operator, and to a charging system for recharging a battery of an electro-hydraulically powered lift ambulance cot with an electrical system of an emergency vehicle.

BACKGROUND OF THE INVENTION

In order to situate a conventional non-powered ambulance cot into the back of an ambulance, two or more attendants often must lift the cot from a relatively low height of approximately 15 cm (about 6 inches) from the ground to a height of almost 1 meter (about 39 inches). Unfortunately, lifting or raising a loaded ambulance cot from this low height increases the risk to these attendants obtaining a back injury or exacerbating an existing one. This problem is exacerbated when handling and transporting a bariatric patient.

SUMMARY OF THE INVENTION

It is against the above background, that the present invention provides a hydraulic lift system to an ambulance cot which will be used to assume all or most of the effort required to lift and/or lower the cot and patient carried thereon. The present invention by providing a power lift ambulance cot for emergency medical services and ambulance-related services addresses the problems associated with the physical strain of raising and lowering a loaded ambulance cot. Accordingly, the present invention has the potential to reduce work related injuries and to reduce the amount of lost work time, as well as therapeutic costs.

Although the present invention is not limited to following specific advantages, it is noted that the present invention allows an attendant to raise or lower a patient with only the touch of a button to activate the hydraulic lift system. When using the hydraulic lift system of the present invention, the cot will lift a patient up to about 363 kilograms (about 700 pounds), thereby addressing scenarios where attendants may be put into a situation where they can injure their back while handling a bariatric patient.

The present invention uses an x-frame design with two hydraulic lift cylinders for raising and lowering the patient, and for providing a smooth and balanced lift operation to the cot. Since the weight of the patient is taken off the attendants and put onto the hydraulic lift system, both attendants now have the ability to assist in holding the weight at the trailing (operator) end of the cot as it's being loaded into a vehicle. Being able to situate the two attendants at the trailing end of the cot allows for an easier loading of the cot into the vehicle, especially one's with floors higher than about 0.7 meters (about 30 inches). It is also to be appreciated that the present invention has an infinite height adjustment range to meet all of the attendant's needed loading positions in order to transfer a patient to and from the cot.

In one embodiment, an electro-hydraulically powered lift ambulance cot comprising a wheeled base having a first slide member slidably supported by a longitudinally extending lower guide is disclosed. A support frame has a second slide member slidably supported by a longitudinally extending upper guide, and is disposed above the wheeled base. A support mechanism, which supports the support frame relative to the wheeled base, is pivotably connected to the support frame, the wheeled base, the first slide member, and the second slide member. A hydraulic lift system is pivotably mounted at a first end to the first slide member, and at a second end to the support mechanism. A motor is mounted to the cot to pump hydraulic fluid under pressure to the lift system in order to assist relative movement between the support frame and the wheeled base. Pilot operated check valves "lock" hydraulic cylinders of the lift system in place when the pump is de-energized to maintain the cot in its desired position. A manual override is also provided to conserve battery power and as a back-up in no-power situations. It is to be appreciated that the above described manual override mode may be used when raising or lowering the cot without power assist, dropping the undercarriage when unloading from a vehicle, and lifting the undercarriage when loading into a vehicle. In another embodiment, a charging system for recharging a battery with an electrical system of an emergency vehicle is disclosed. The charging system comprises a first connector having at least one contact pad electrically contacted to the battery; and a second connector having at least one prong configured to be contactable with the at least one contact pad. The at least one prong when contacting the at least one contact pad completes an electrical circuit which connects the battery to the electrical system of the emergency vehicle.

These and other features and advantages of the invention will be more fully understood from the following description of a preferred embodiment of the invention taken together with the accompanying drawings. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiment(s) of the present invention. Additionally, parts and portion of some elements may be removed to help improve understanding of the embodiments of the present invention.

DETAILED DESCRIPTION

With reference to FIGS. 1-5, a retractable ambulance cot according to one embodiment of this invention is shown generally as 2. Upon the cot 2 a patient 4 may be supported, and conveniently loaded onto an elevated surface 6, such as for example, the transport bay of an ambulance. It is to be appreciated that the cot 2 functions at ambulance load heights up to about 0.9 meters (about 34 inches), thereby reducing the physical strain of loading an ambulance cot into an ambulance. Additionally, it is to be appreciated that the cot 2 unloaded weighs less than about 61 kilograms (about 135 pounds). The overall dimensions of the cot 2 is about 2.1 meters (about 83 inches) long by about 0.6 meters (about 24 inches) wide by about 0.33 meters (about 13 inches) high in the fully lowered position, a position illustrated by FIG. 2.

Figure 1:
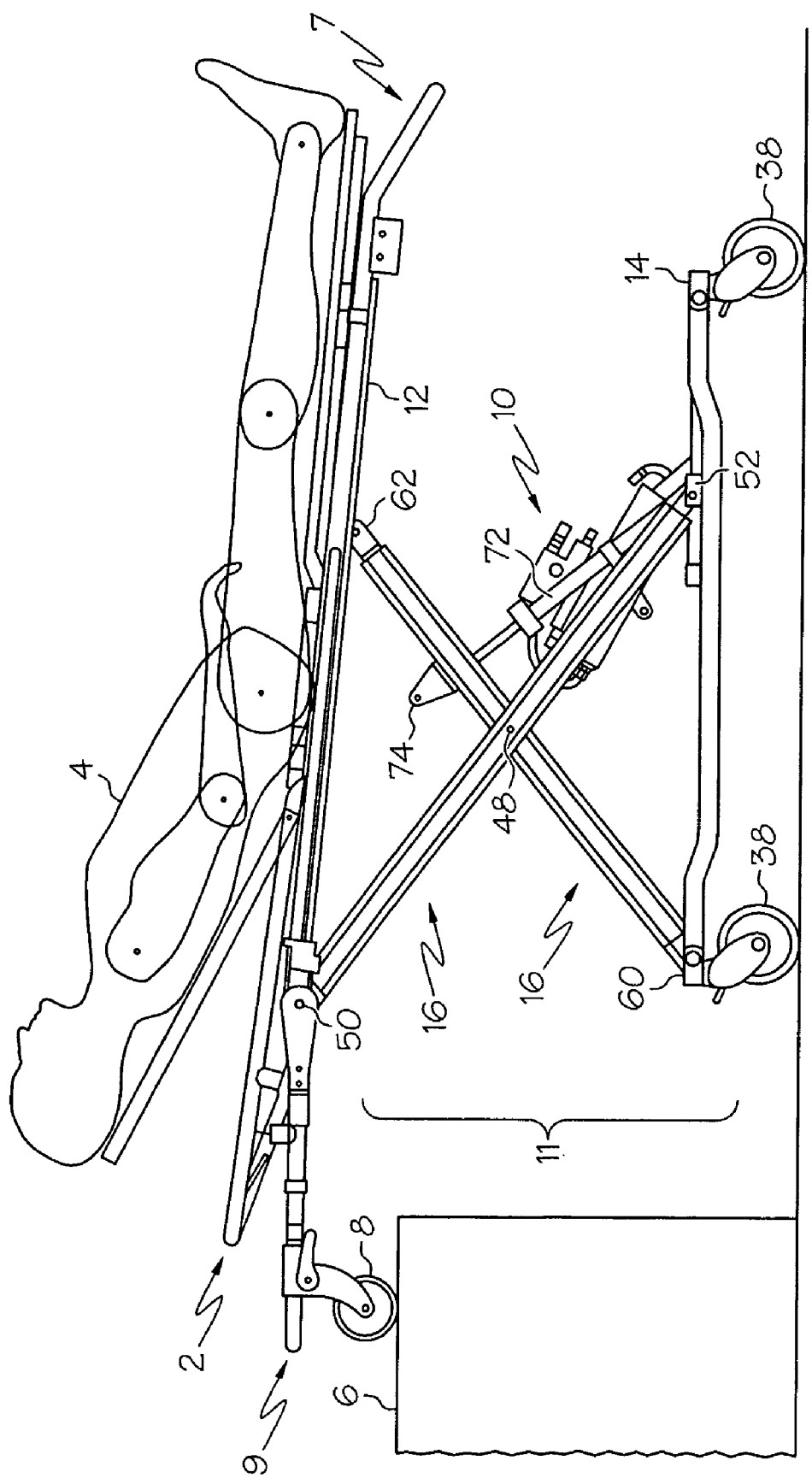
FIG. 1 is an illustrated side view of a cot according to the invention situated in a fully elevated position.
Figure 2:
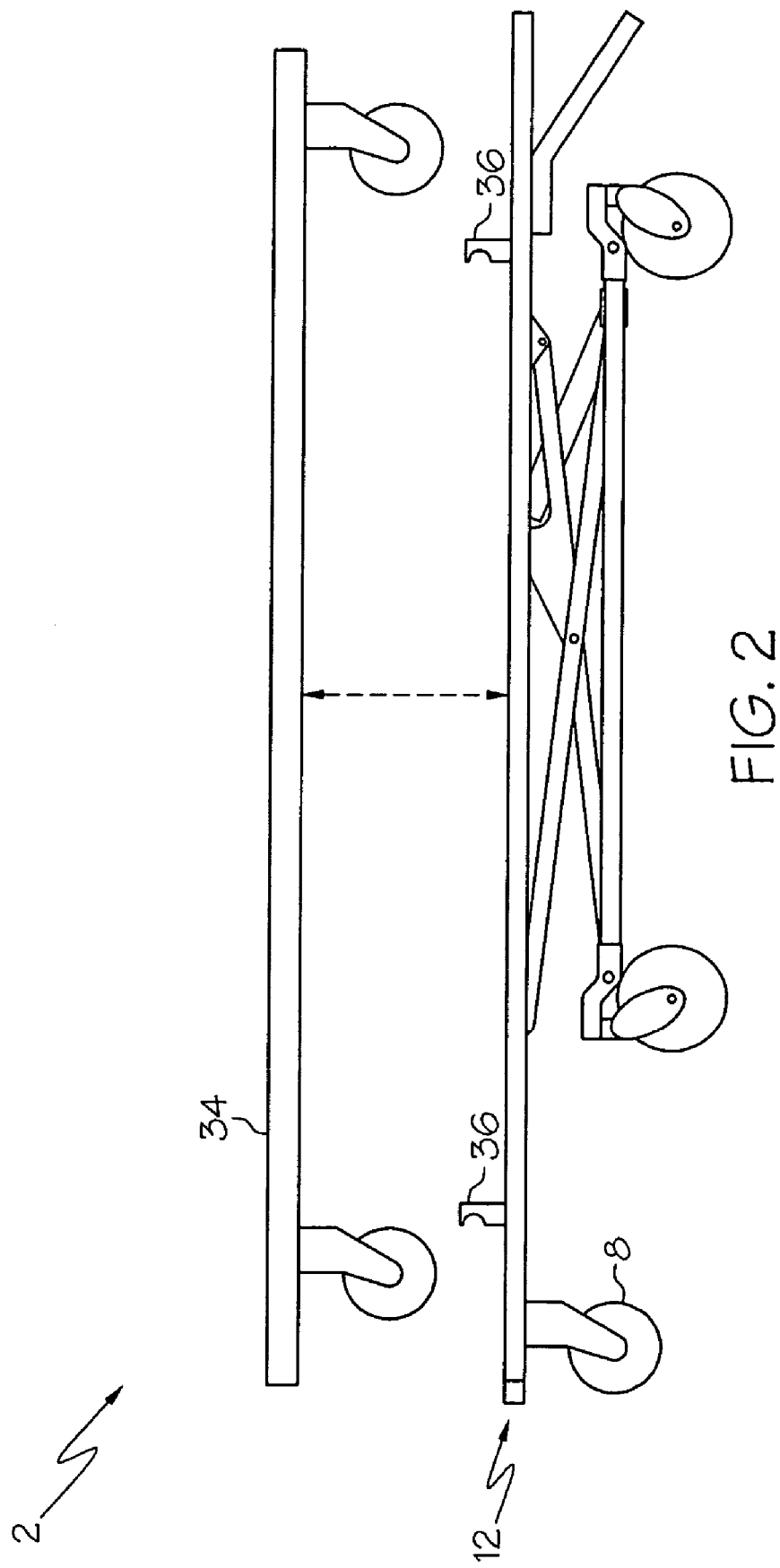
FIG. 2 is an illustrated side view of a cot according to the invention in a lowered position.

Referring to FIG. 1, the cot 2 is illustrated in a fully elevated position. It is to be appreciated that a single attendant can hold and manipulate the trailing end 7 of the cot 2 in the elevated position in order to rest loading wheels 8 provided at the leading end 9 of the cot onto the elevated surface 6. Operation of an associated hydraulic lift system, shown generally as 10, as described herein in a later section, causes the undercarriage to be hydraulically raised to the level of the elevated surface 6 allowing the attendant to transfer the cot 2 thereon in a lowered position, such as depicted by FIG. 2. It is to be appreciated that the cot 2 when situated in a fully lowered position, loading wheels 8 and swivel wheels 38 support the cot 2 upon the elevated surface 6.

The hydraulic lift system 10 also hydraulically raises the cot 2 from the lowered position to the raised position, and an infinite number of positions therebetween. Pressure in the hydraulic lift system 10 may also be manually released to cause the cot 2 to be lowered from the raised position to the lowered position, and an infinite number of positions therebetween, to conserve battery power and as a back-up in no-power situations. It is also to be appreciated that the above described manual mode may also be used when raising the cot without power assist, dropping the undercarriage when unloading from a vehicle, and lifting the undercarriage when loading into a vehicle.

The undercarriage, generally indicated by symbol 11, of the cot 2 comprises an upper frame 12, a lower frame 14, and a support mechanism shown generally as 16 disposed therebetween for supporting the upper frame 12 relative to the lower frame 14. The upper frame 12 is generally rectangular, and in the illustrated embodiment shown by FIG. 3, comprises at the leading end 9, a leading end frame member 18 coupled to a pair of opposed, longitudinally extending side frame members 20, 20'. At the trailing end 7, the side frame members 20, 20' are coupled rotatably to a trailing end frame member 22, having a bent U-shape. The frame members 18, 20, 20', and 22 are a tubular material, such as metal, laminate, plastics, or combinations thereof.

In the illustrated embodiment, the leading end frame member 18 is coupled rotatably to the opposed side frame members 20, 20' and is a drop frame, such as the type disclosed by U.S. Pat. No. 6,701,545, a patent commonly assigned to Ferno Washington, Inc., and the disclosure of which is herein fully incorporated by reference. The loading wheels 8 are provided to the leading end frame member 18.

Figure 3:
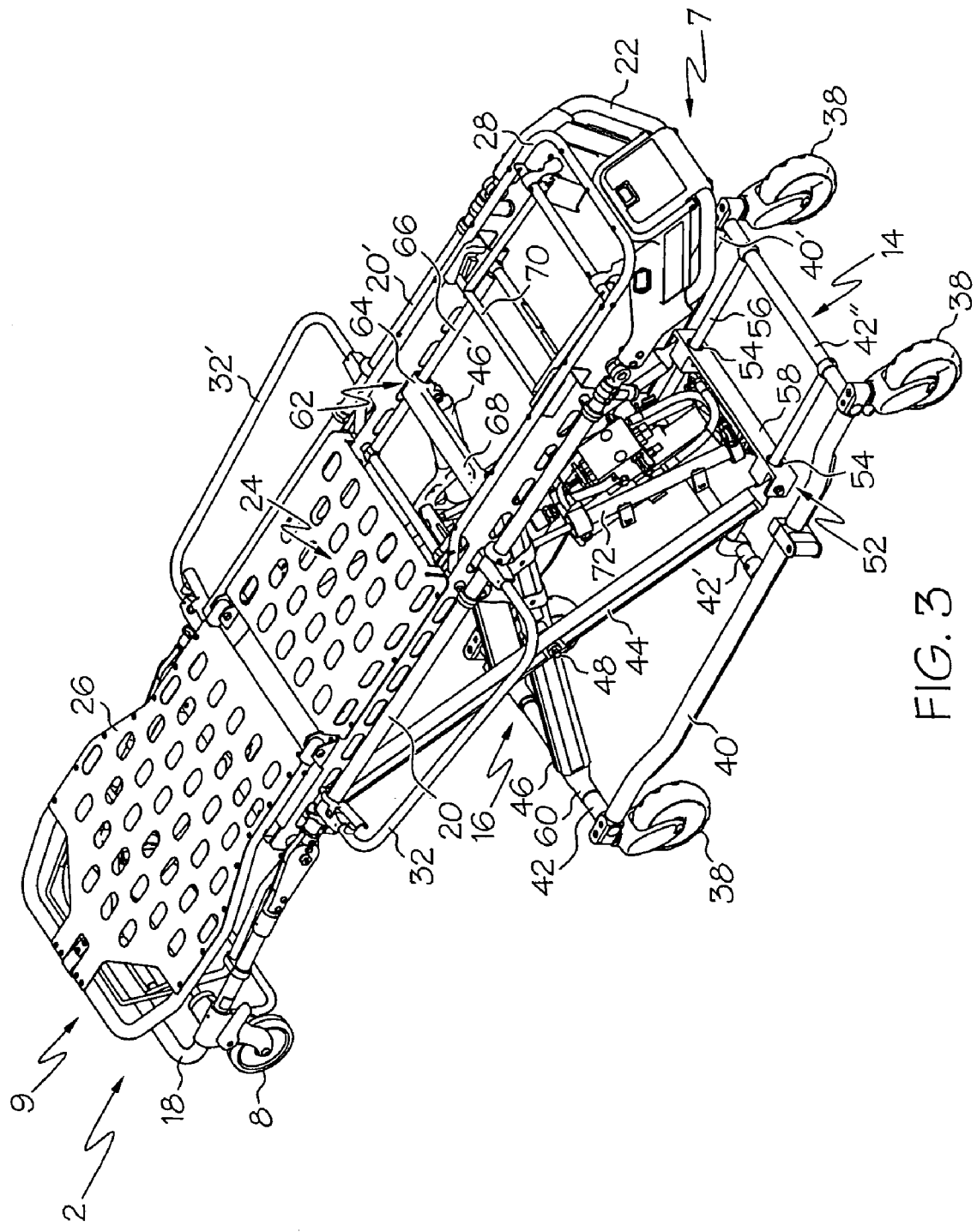
FIG. 3 is an illustrated elevated perspective view of a first side of a cot according to the invention, with parts removed for ease of illustration.
Figure 5:
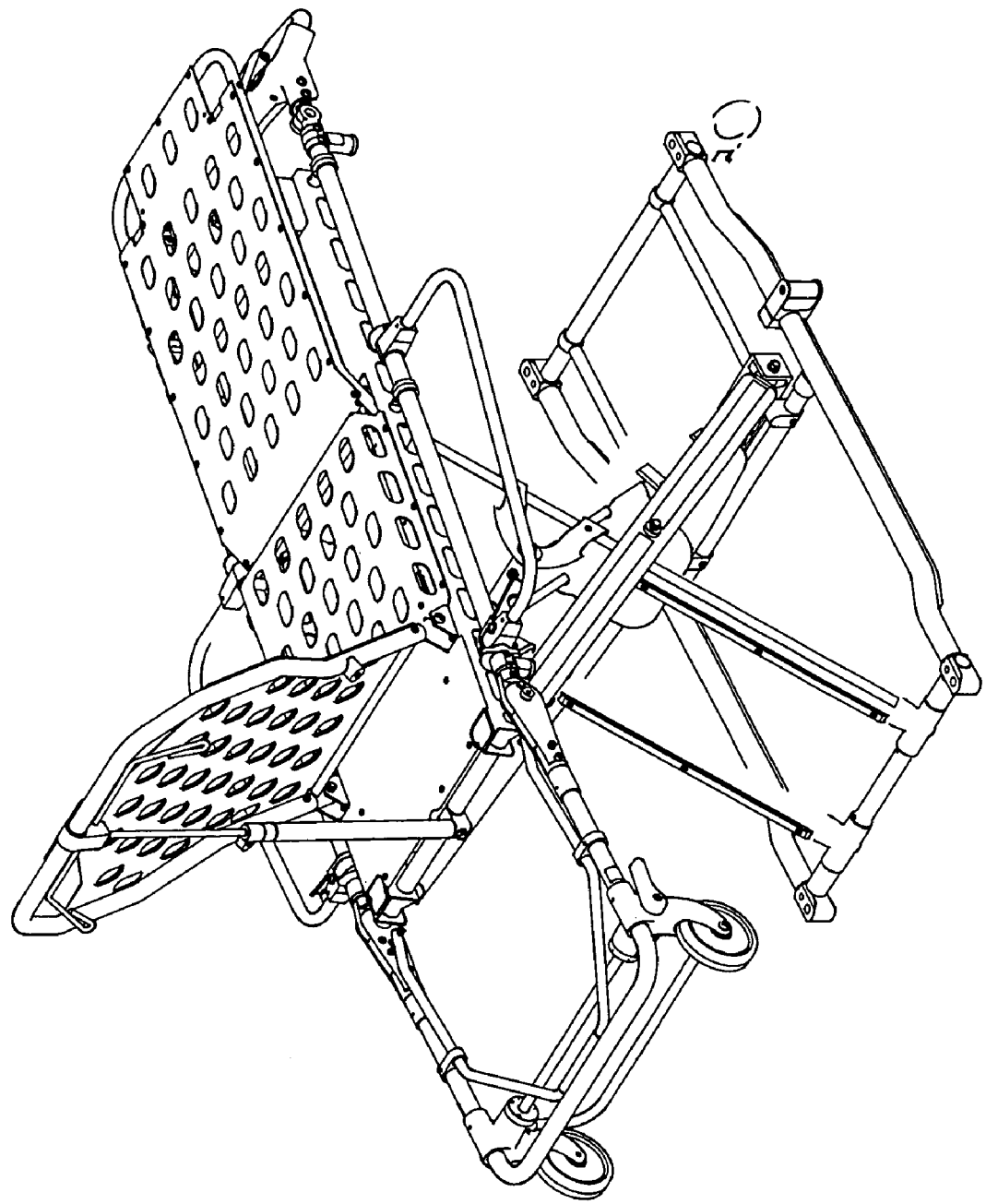
FIG. 5 is an illustrated elevated perspective view of a cot according to the invention.

In one embodiment, the upper frame 12 includes a patient bed shown generally as 24 in FIG. 3, upon which the patient 4 rests, as is illustrated in FIG. 1. The patient bed 24 includes raisable back and leg rests 26 and 28, respectively. Situated below the back rest 26 is a battery 30, which is best shown by FIG. 5. Battery 30 provides the necessary power to operate the hydraulic lift system 10 according to the invention, and is rechargeable without being removed from the cot via an electric connection to an external source. It is to be appreciated that the term "battery" includes single cell batteries and multiple cell batteries.

Figure 8:
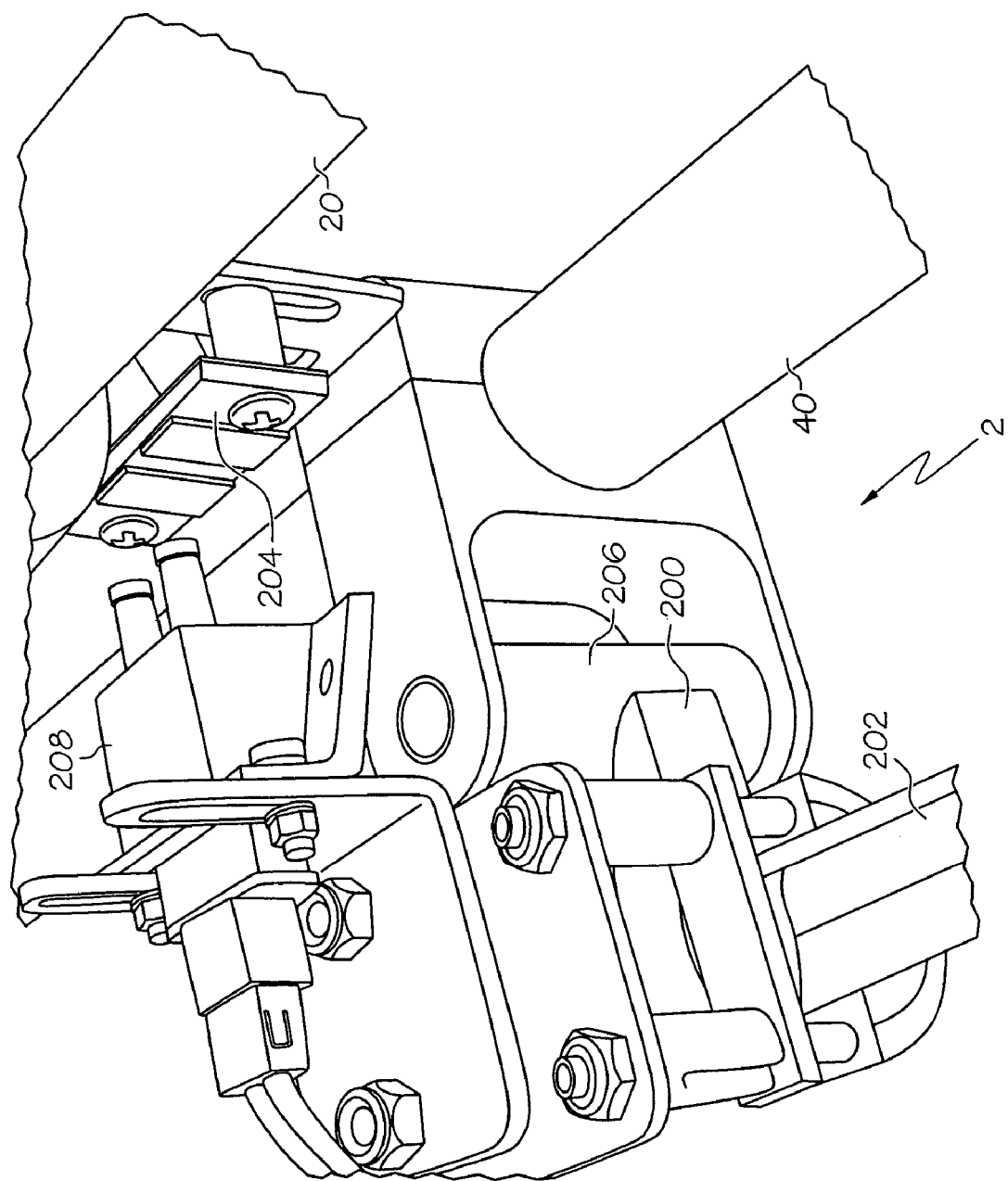
FIG. 8 is an illustrated close-up section view of a portion of a cot according to the invention showing a charging connection.
Figure 13B:
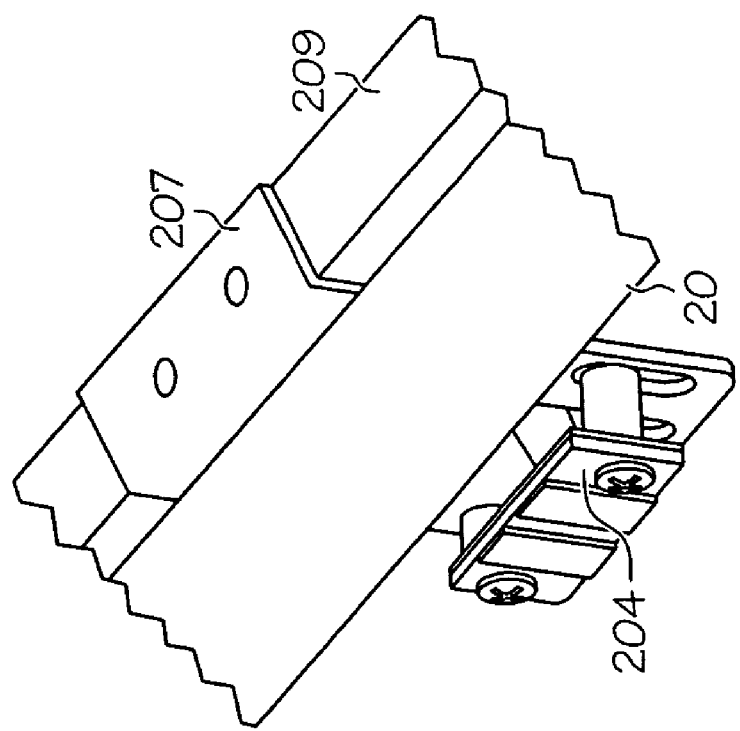
FIGS. 13A and 13B are illustrated close-up section view of a portion of a cot showing embodiments of connecting a charging connection according to the present invention.
Figure 13A:
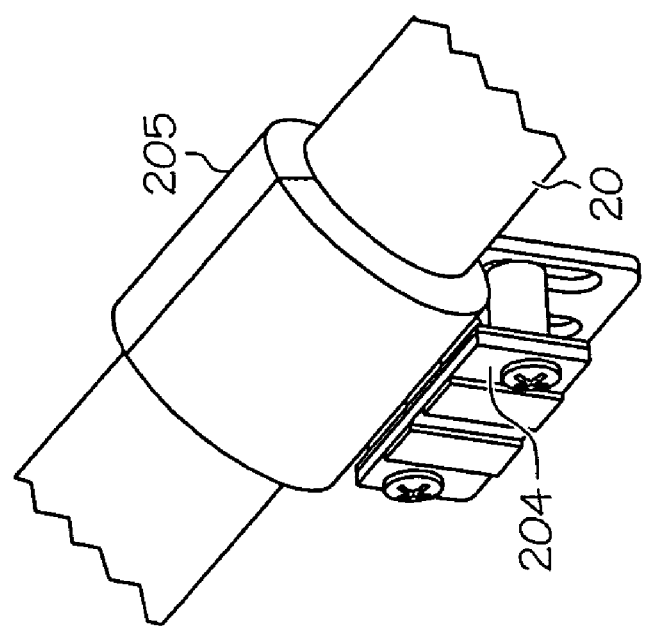

In one embodiment, an electrical connection is made through the use of an extension cord (not shown). In another embodiment, such as illustrated by FIG. 8, an electrical connection is made through a cot fastening device 200 situated in an emergency vehicle, represented by portion 202. The cot 2 in the illustrated embodiment provides an electrical contact pad 204 adjacent a fastening member 206 that is mounted to the cot. As shown by FIG. 5, in one embodiment, the electrical contact pads 204 and fastening member 206 are provided to the side frame members 20 and 40, respectively. As shown by FIG. 13A, the electrical contact pad 204 is removably fastened to the frame member 20 via a clamp 205. In still another embodiment shown by FIG. 13B, the electrical contact pad 204 is mounted to a plate 207 which is attached to a cot frame member, such as a longitudinally extending spine 209. In another embodiment, the electrical contact pad 204 may be situated with the fastening member 206 on the lower frame 14 of the cot 2, or vice versa. It is to be appreciated that in all the above mentioned embodiments, the electrical contact pad 204 is situated on the side of ambulance cot which is adjacent the cot fastening device 200.

In any of the above embodiments, when the cot 2 is situated into the emergency vehicle and the fastening device 200 releasably securing the fastening member 206, an electric connection with an external source, such the vehicles electrical system, is made. An electrical connection is made through the use of electrical prongs 208 provided adjacent the fastening device 200, and which contact the electrical contact pads 204. It is to be appreciated that movable protective covers may be provided to one or both of the contact pads and electric prongs.

Figure 9:
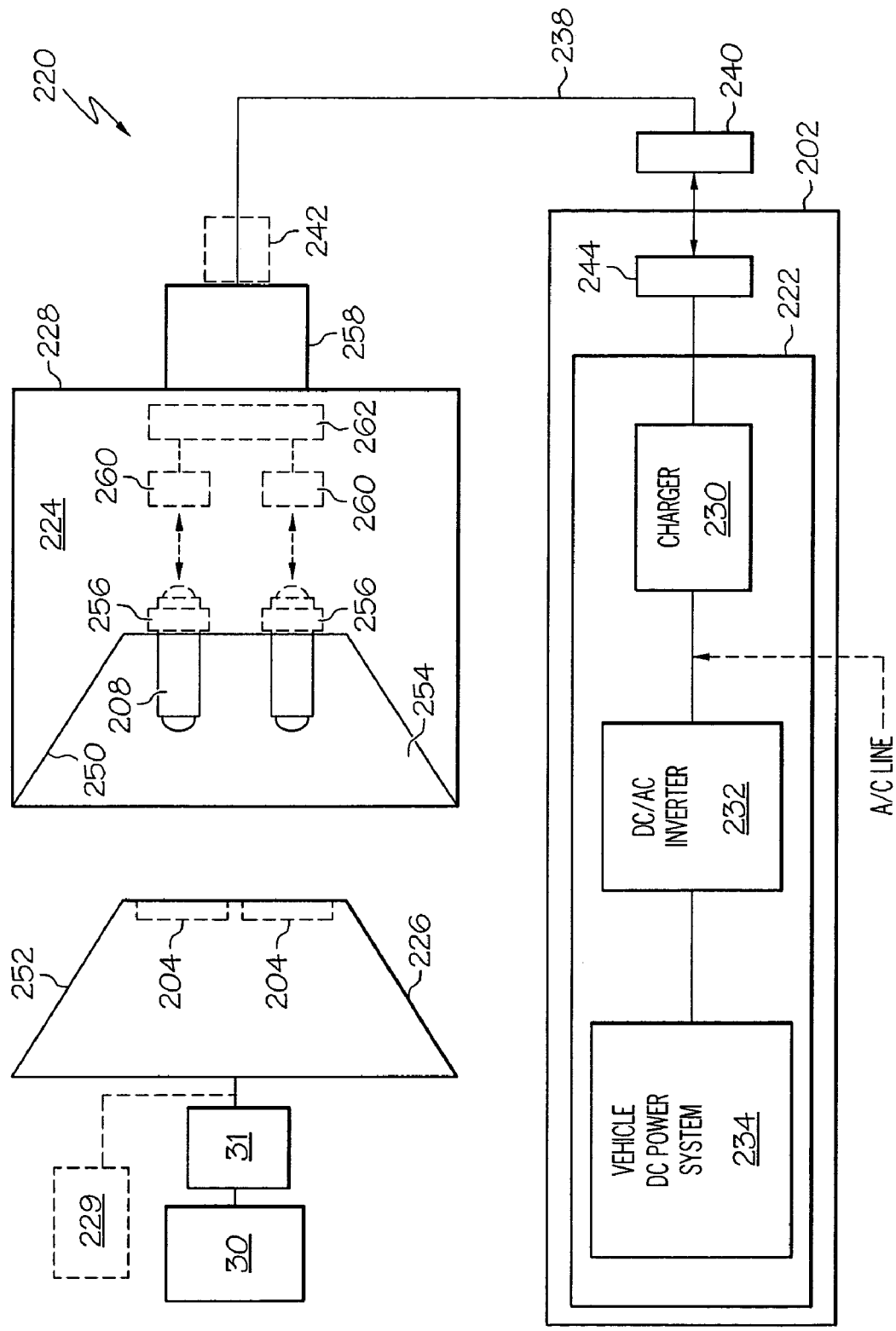
FIG. 9 shows a block diagram of a charging system according to the present invention.

With reference to FIG. 9, a charging system 220 for recharging the battery 30 with an electrical system 222 of an emergency vehicle 202 is disclosed. The charging system 220 comprises a first connector 226 housing the electrical contact pads 204, which are electrically contacted to the battery 30 through the cot's electrical system 31. The charging system 220 further includes a second connector 228 which houses the electrical prongs 208. As mentioned previously above, each electrical prong 208 is configured to be contactable with a respective one of the contact pads 204, which when contacted together completes an electrical circuit which connects the battery 30 to the electrical system 222 of the emergency vehicle 224 for charging.

The electrical system 222 includes a charger 230 connected to a DC to AC inverter 232, and the vehicle's power system or alternator 234 which provide power to the inverter 232. Alternative, the charger 230 may be supplied power via an external AC line 236. The inverter 232 is any conventional inverter suitable to convert DC power from the alternator 234, which is also conventional, to AC power suitable for powering the charger 230. The charger 230 is any conventional charger suitable to charge the battery 30 of the cot 2. It is to be appreciated, that the charging system 220 in one embodiment includes the charger 230 and inverter 232 if the emergency vehicle is not so configured with a suitable DC outlet. In still another embodiment, the charging system includes the charger 230 if a suitable AC outlet is available in the emergency vehicle.

With continued reference to FIG. 9, power from the charger 222 is provided to the second connector 228 via a power cord 238. In one embodiment, the power cord 238 has a plug 240 at one end and is hard wired to the second connector 228 at the other to provide power to the electrical prongs 208. In another embodiment, another plug 242 is provided at the other end, which is removably attachable to the second connector 228. In both embodiments, the power cord 238 is also removably attachable to a suitable plug receptacle 244 electrically connected to the charger 230.

Figure 10:
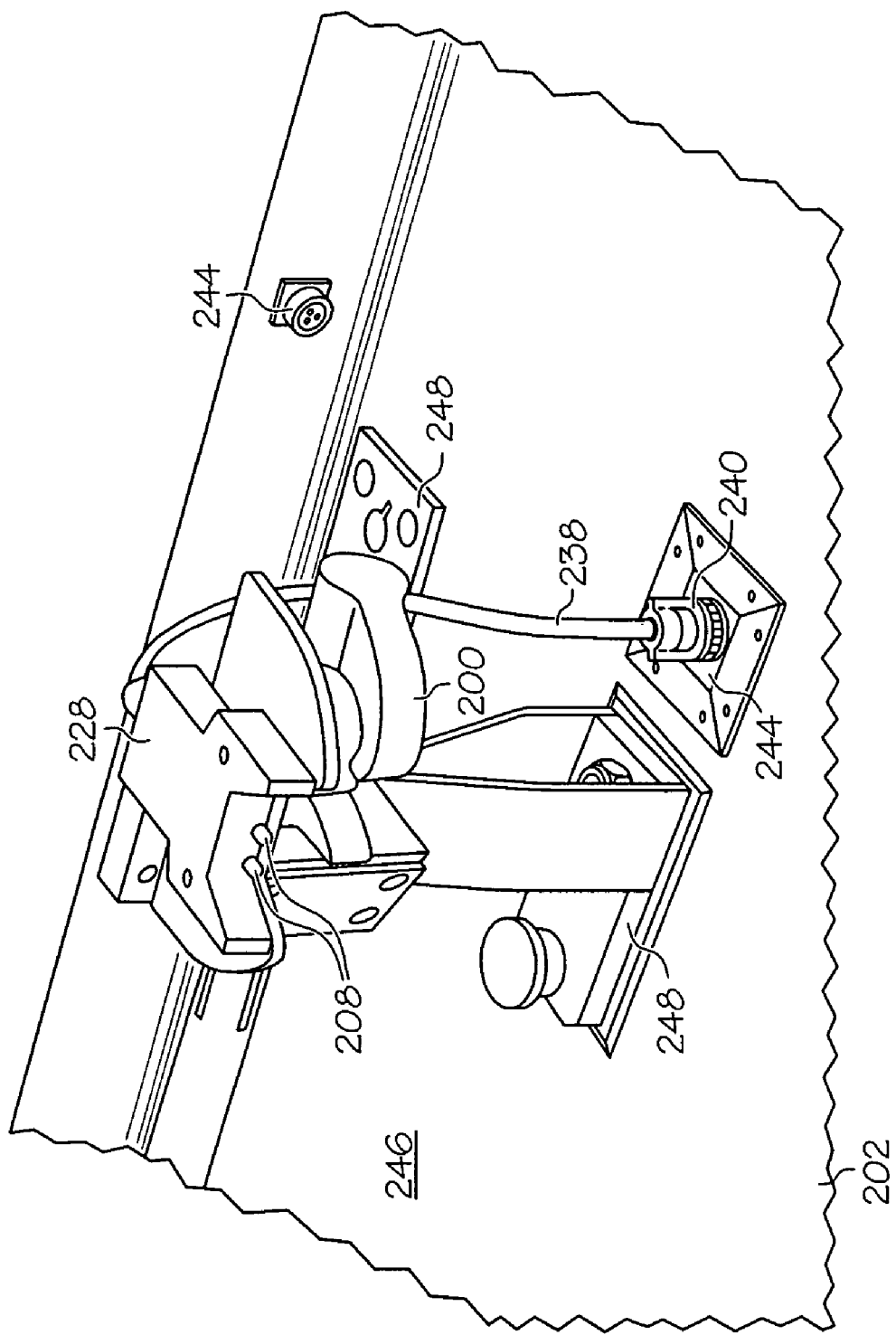
FIGS. 10 and 11 are perspective views of portions of the charging system situated in a transport bay of an emergency vehicle according to the present invention.
Figure 11:
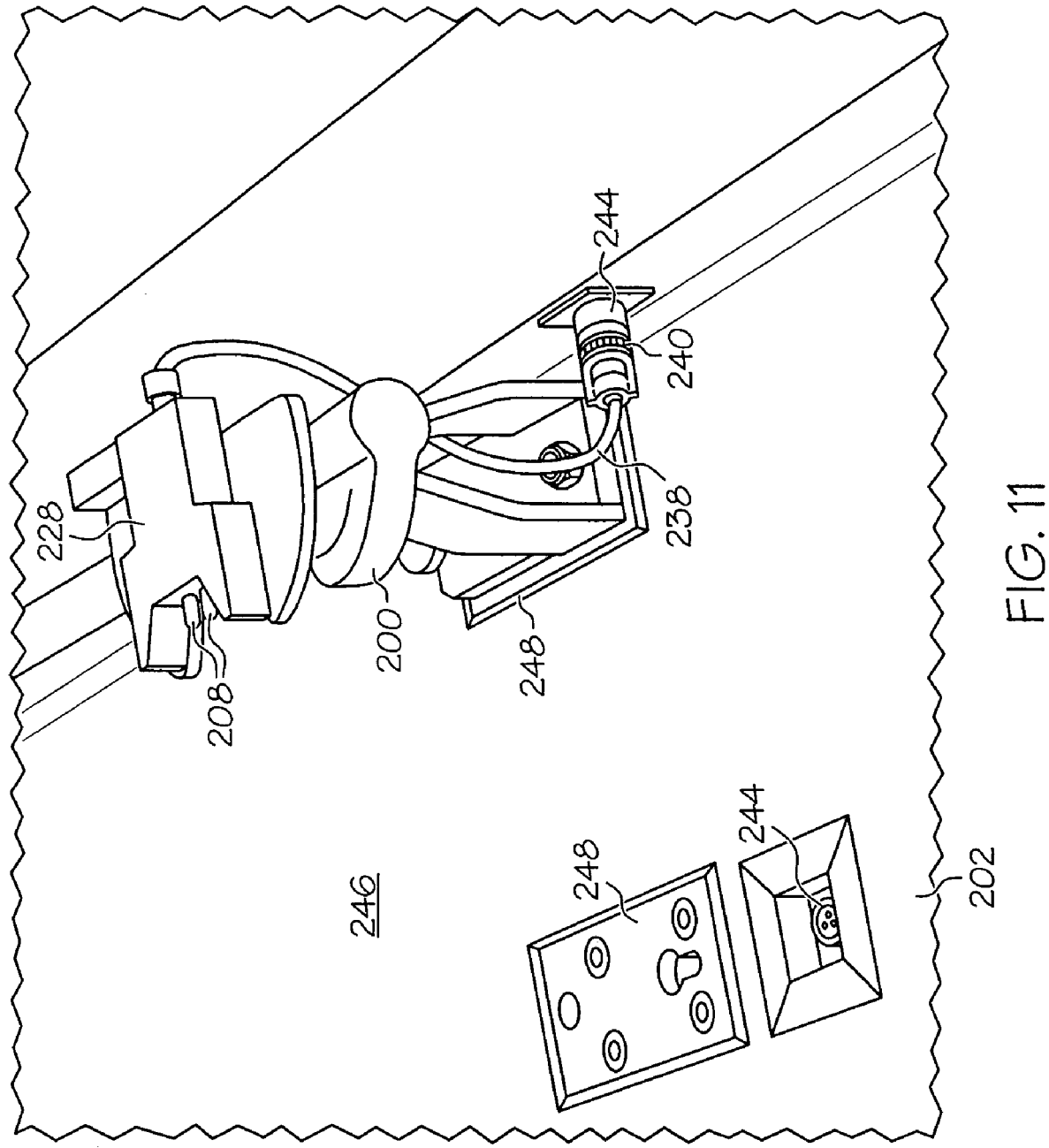

As illustrated by FIGS. 10 and 11, in one embodiment, a number of the plug receptacles 244 are provided at various locations with in a transport bay 246 of the emergency vehicle 202. As mentioned previously above, in one embodiment the second connector 228 is mounted to the cot fastening device 200, such that when the cot 2 is secured to the cot fastening device 200, an electrical connection is made between the battery 30 and the electrical system 222 for charging. It is to be appreciated that the second connector 228 may also be used to not only charge the cot batteries but, also to charge (or power) additional medical equipment which might happen to be attached to the cot or in the emergency vehicle. For example an outlet 229 for a plug of the medical equipment may be conveniently located on the cot frame or available as an retractable extension cord to provide an electrical connection to the electrical system 222 and/or battery 30 for the medical equipment.

It is to be appreciated that the cot fastening device 200 may be mountable to various locations within the transport bay via provided mounting pads 248. Accordingly, in one embodiment, the plug receptacles 244 are provided adjacent a respective mounting pad 248 to provide a convenient electrical connection point of the second connector 228, via power cord 238, to the electrical system 222. It is further to be appreciated that the second connector 228 and power cord 238 are entirely removable from the transport bay by disconnecting the power cord 238 from the power receptacle 244, which is a notably convenience when cleaning and sanitizing the transport bay as is regularly required.

It is also to be appreciated that the second connector 228 in one embodiment is detachably mounted to the fastening device 200. In such an embodiment, the power cord 238 could be extendable such that other portable equipment in the emergency vehicle may be connected to the charging system 220. A set of adapters (not shown) may be also be provided which secures to the second connector 228 such that the other portable equipment may electrically interface with the second connector 228. Further, it is to be appreciated that the second connector 228 may be mounted in various locations with in the transport bay 246. Special mounts (not shown) may be provided to accommodate the various mounting locations, such as to a fastening arm, antler type fastening system, a wall, and the likes.

Referring back to FIG. 9, in one embodiment, the electrical prongs 208 are slidingly mounted in a respective aperture (not shown) in a side 250 of the second connector 228, and spring-biased in the extended position. As can be seen, in one embodiment, the side 250 through which the prongs 208 extend outwardly therefrom is complimentary in shape to the trapezoidal shape of a side 252 of the first connecter 226. The complimentary shapes of the sides 250, 252 ensure that a proper connection between the contact pads 204 and the electrical prongs 208 is achieved. A cover 254 may be provided prevent objects from coming into contact with the pins when seated to the contact pads from above.

The electrical prongs 208 are spring bias by a respective coil spring 256 provided in the housing 224 of the second connector 228. In one embodiment, the prongs 208 are hard wired to the power cord 238 or, if so configured, a receptacle 258 in the housing 224 for the plug 242 of the power cord 238. In another embodiment, the prongs 208 being spring bias, are situated a distance from a pair of electrical contacts 260 within the housing 224 of the second connector 228. In such an embodiment, as the prongs 208 are moved by initial contact with the contact pads 204, the prongs will slide into contact with the electrical contacts 260 which energize the prongs. In still another embodiment, the electrical contacts 260 and/or the prongs 208 may be wired to at least one safety interlock switch 262, which de-energizes the circuit when the prongs are disengaged from the contact pads 204. The safety interlock switch 262 in one embodiment is mechanically operated and in another embodiment is magnetically operated. Accordingly, in these embodiments the electrical prongs 208 are de-activated when not in contact with the contact pads 204.

Figure 12:
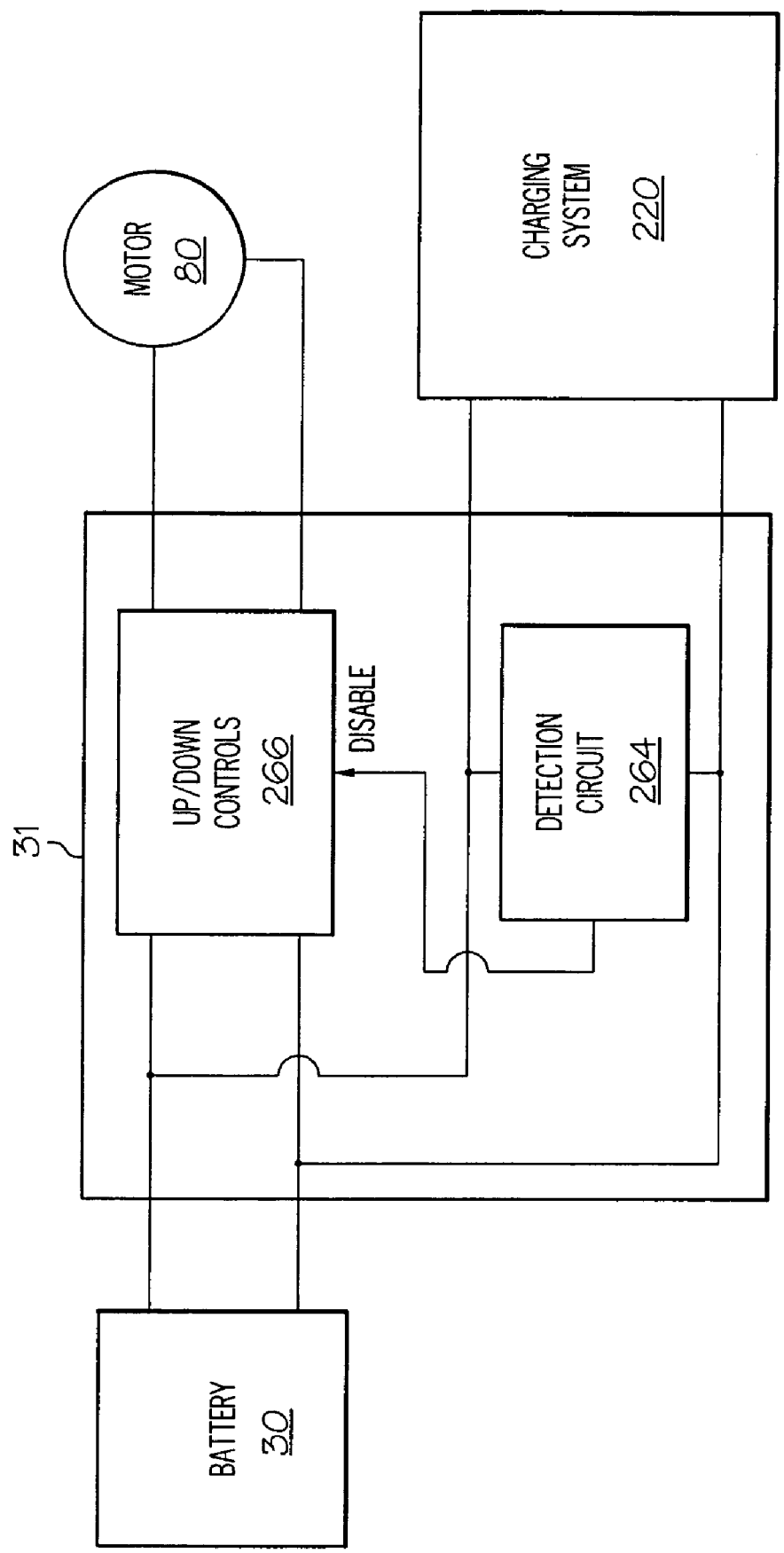
FIG. 12 is an electrical wire diagram of a cut-out circuit according to the present invention.

It is to be appreciated that one of the safety features of the charging system 220 of the present invention is that when charging, the cot 2 cannot be operated (up or down). With reference made also to FIG. 12, when the cot 2 is loaded into the transport bay 246 and secured to the fastening device 200, a detection circuit 264 provided in the cot's electrical system 31 detects that an electrical connection has been made with the charging system 220, via contact between the contact pads 204 and the electrical prongs 208. Because of this connection, the detection circuit 264 disables controls 266 which are used to command either the raising (up) or the lowering (down) the cot 2, through powering of the motor 80 in either the forward or reverse direction, respectively. Accordingly, the cot 2 cannot be raised during transport, which otherwise may present a dangerous situation to the patient, attendant, and equipment.

In addition to the above mentioned safety features of the charging system 220 of the present invention, the use of charging system permits the efficient use of lead acid batteries, rather than the need for the use of expensive nickel cadmium batteries. Nickel cadmium batteries are relatively more expensive than lead acid batteries and also require a user to use the battery until fully discharge and then waiting until fully charged. However, fully discharging and waiting to fully charge a nickel-cadmium battery possess a number of problems. Providing such a battery if not fully used or charged causes a memory reducing the service life of the battery, adding additional replacement costs, and utility in the field. In the field, users may unexpectedly be faced with a battery that cannot hold a charge, due to the charging memory, rendering the lifting mechanism useless. Carrying spare batteries is also not practical in time-sensitive situates where other more important equipment needs to be brought to a rescue scene. The charging system of the present invention avoids these problems since lead acid batteries have no memory, unlike nickel cadmium batteries, and thus can be continuously charged.

Because of a lead acid battery can be continuously charged, the present charging system presents a number of advantages. For example, whenever the cot 2 is situated in the transport bay 246 of the emergency vehicle 202, the battery 30 is being charged by the charging system 220. Since the battery is lead acid based, it make no difference if the battery is fully charged or in need of a slight charge. As the cot is removed from the transport bay, the cot runs on the battery. As mentioned above, the battery 30 in one embodiment has the ability to cycle the cot fully loaded approximately 20 times on a fully charged battery.

However, in practical use, the cot 2 will most likely only be needed to be cycled or operated four time per patient pick up. The cycles include: lowering the cot legs when removing the cot from the transport bay; lowering the cot to place the patient thereon; raising the cot and patient to a height such that the cot and patient may be rolled into transport bay; and raising the undercarriage of the cot such that cot may be fully rolled into the transport bay. At this point, the cot 2 is once again connected to the charging system 220, which is re-charging the battery 30 during transport of the cot and patient to an emergency facility. It is envisioned that in use the charge system 220 will become transparent to the operator as the battery size will be such that the battery will have sufficient power to operate the cot through a number of cycles without a significant drop in battery charge due to the time between cycles of charging of the battery and the use of the cot. Such would not be possible with a nickel-cadmium battery.

The battery 30, which in one embodiment provides 24 VDC, 25 amps, provides enough energy to lift and lower the upper frame 12 relative to the lower frame 14 while supporting a patient weighing about 227 kilograms (about 500 pounds) about 20 times before needing a recharge. The number of cycles can be increased by utilizing the manual override, and gravity, to conserve power when lowering the cot from an elevated position (FIG. 1) to a lowered position (FIG. 2). In other embodiments, other voltages and amperes may be used.

As shown by FIG. 3, the upper frame 12 further includes a pair of sidearm supports 32, 32' which are each rotatably mounted to respective side frame members 20, 20'. It is to be appreciated that the pair of sidearm supports 32, 32' rotate about an axis, which is the central axis of each side frame members 20, 20'. Each sidearm support 32, 32' can rotate about 180 degrees from a vertically up position to a nearly vertically down position, or to an outwardly extended position, as is illustrated in FIG. 3.

In another embodiment, the upper frame 12 is a support platform for releasably receiving a multipurpose roll-in cot shown generally as 34 in FIG. 9. The upper frame 12 in this embodiment would be provided without the back and leg rests 26 and 28 (FIG. 3) and would be provided with mounting engagements 36 to support multipurpose roll-in cots such as, for example, the types disclosed by U.S. Pat. No. 4,037,871, and PCT Application No. U.S. Ser. No. 01/45144 (WO0239944), references commonly assigned to Ferno Washington, Inc., the disclosures of which are herein fully incorporated by reference.

As best illustrated by FIG. 3, the lower frame 14 is generally rectangular, and has a set of swivel wheels 38 at each corner thereof. The wheels 38 may be conventional caster wheels with foot-operated locking mechanisms. The lower frame 14 comprises a pair of longitudinally extending side frame members 40, 40' separated by three transverse frame members 42, 42', and 42" provided at the loading end, an approximate midsection of the lower frame 14, and the trailing end, respectively.

The support mechanism 16 is an x-frame that includes a first pair of parallel legs 44, 44' and a second pair of parallel legs 46, 46'. Respective ones of the pairs of legs 44, 46 and 44', 46' are pivotably connected at an intermediate location by a pivot brace or connection 48. The upper frame 12 is connected to each of the first pair of legs 44, 44' by a pivot 50 (the pivots on both sides of the frame 12 are the same), which is best shown in FIG. 1. The lower ends of the first pair of legs 44, 44' are pivotably connected to the lower frame 14 by a first slide member 52.

With reference to FIG. 3, the first slide member shown generally as symbol 52 comprises linear bearings 54 slidably supported by longitudinally extending bearing supports or guide 56 and mounted to a bracket 58. If desired, linear bearings 54 and bracket 58 may be a unitary component. As illustrated, the guide 56 is mounted between the transverse frame members 42' and 42" of the lower frame 14. The lower ends of the first pair of legs 44, 44' are also pivotably mounted to bracket 58. The lower ends of the second pair of legs 46, 46' are pivotably connected to the leading transverse frame member 42 of the lower support frame 14 also by pivots 60. The upper ends of the second pair of legs 46, 46' are pivotably connected to upper frame 12 by a second slide member shown generally as 62. The second slide member 62 comprises linear bearings 64 slidably supported by longitudinally extending bearing supports or guide 66, and a bracket 68 upon which the upper ends of the second pair of legs 46, 46' are pivotably mounted. The guide 66 is mounted to the upper frame 12 via a laterally extending brace 70.

Figure 4:
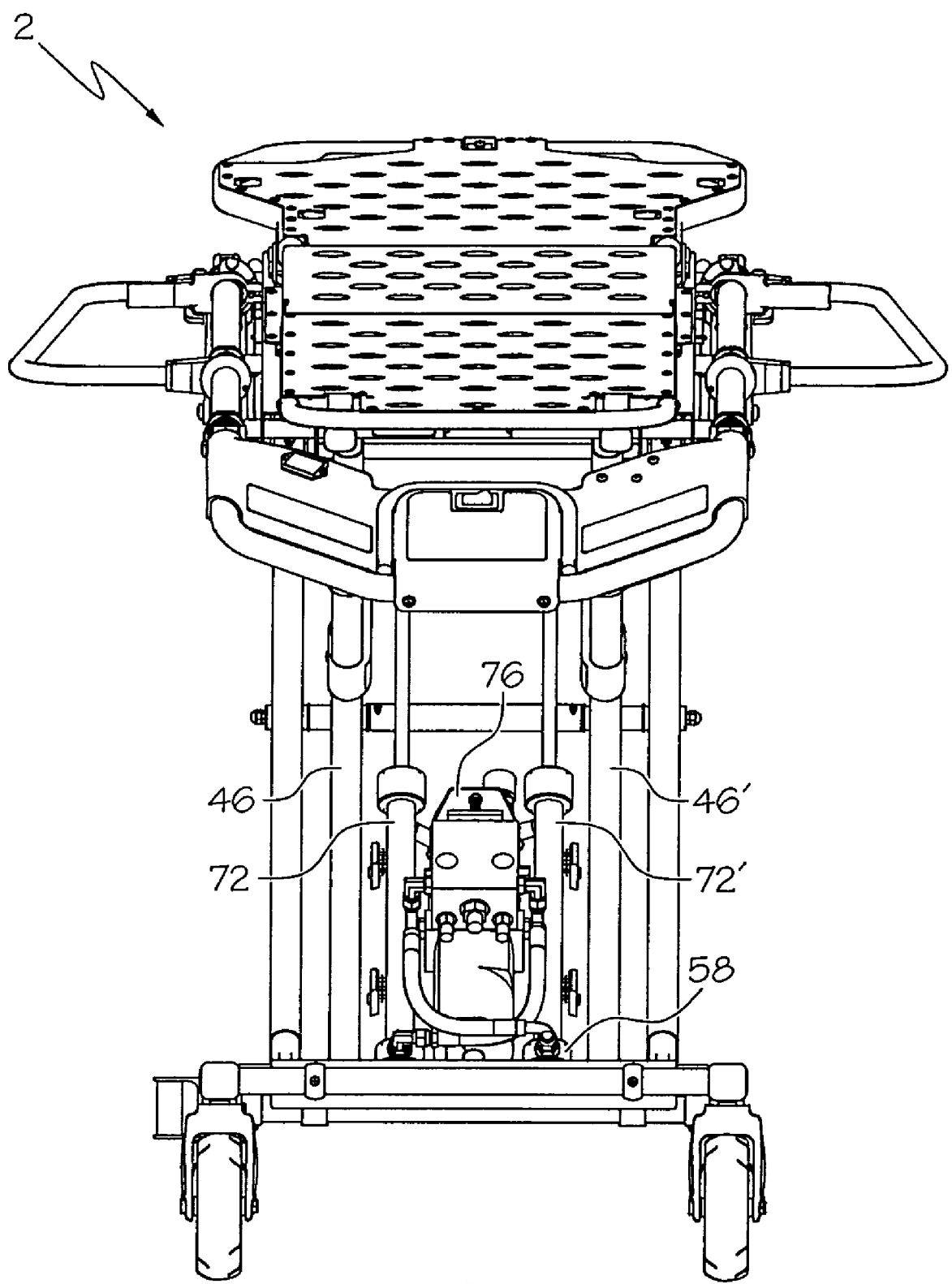
FIG. 4 is an illustrated trailing (operator) end view of a cot according to the invention with parts removed for ease of illustration.

The hydraulic lift system 10 is also pivotably mounted between the second pair of legs 46, 46' and the first slide member 52. As best illustrated by FIG. 4, the lift system 10 utilizes a pair of hydraulic cylinders 72, 72'. The lower ends of the cylinders 72 are pivoted off bracket 58 and move along with the first slide member 52. The upper ends of the cylinders 72, 72' are pivoted off a bar attachment 74 mounted between the second pair of legs 46, 46' above the pivot braces or connections 48. The bar attachment 74 mounted above the connections 48 provides a mechanical advantage at the beginning of the lift sequence, wherein slightly less than about 1.8 kilograms (about 4 pounds) of mechanical lift is needed per about 0.45 kilograms (about 1 pound) of patient.

Accordingly, in one exemplary embodiment, based upon utilizing a pair of 2.54 cm (1-inch) diameter hydraulic cylinders with about 25.4 cm (about 10 inches) of stroke and a working pressure of about 13.8 MPa (about 2000 psi), the cot 2 is able to lift a patient weighing about 317.5 kilograms (about 700 pounds). As also best illustrated by FIG. 4, an electro-hydraulic system 76 of the hydraulic lift system 10 is provided to the cot 2 between the pair of hydraulic cylinders 72, 72'. As illustrated in FIG. 5, a protective cover 210 is provided enclosing the electro-hydraulic system 76. The electro-hydraulic system 76 is discussed in greater detail hereafter in reference to FIG. 6.

Figure 6:
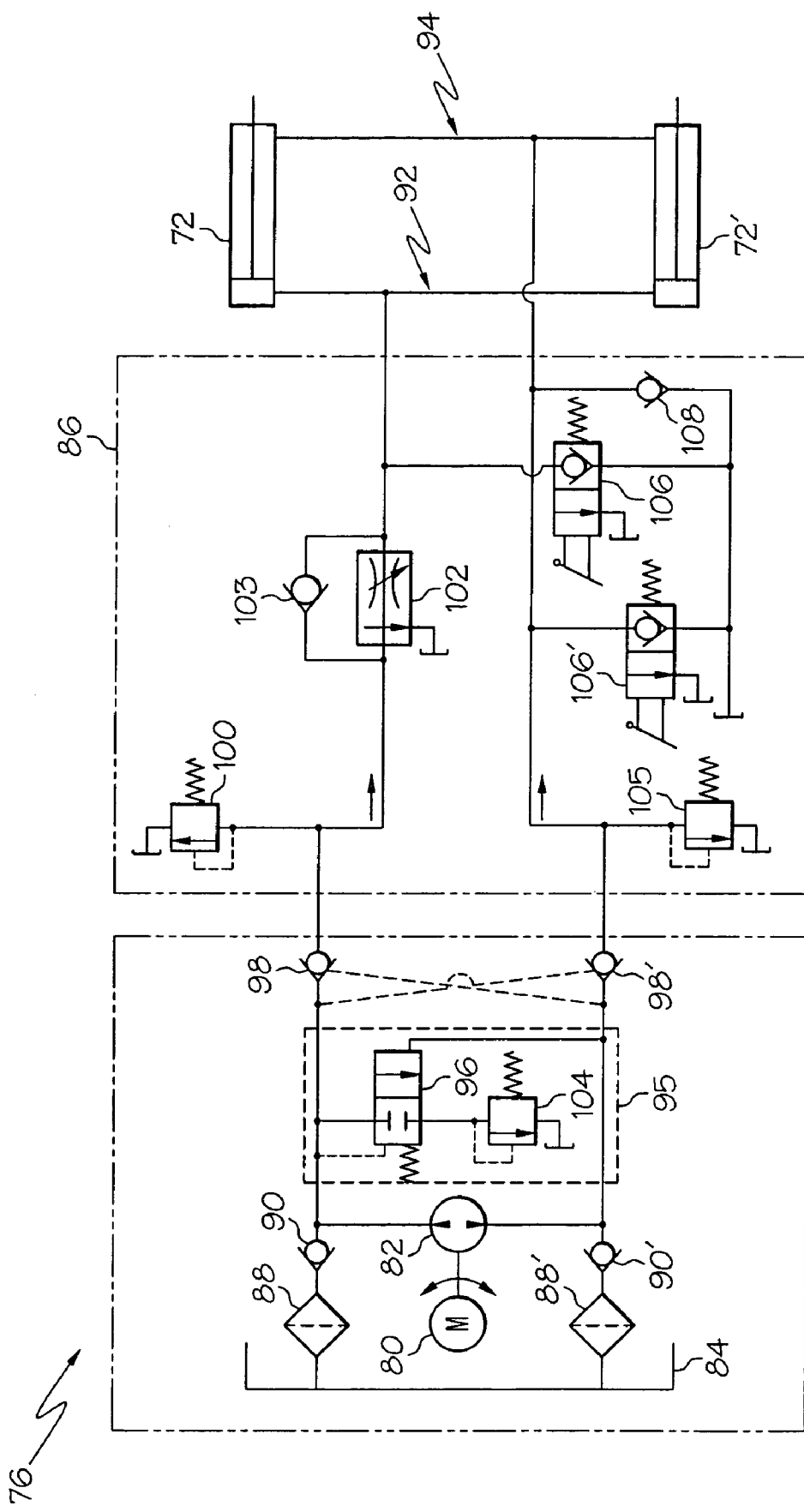
FIG. 6 shows a connection diagram of the hydraulic system according to an embodiment of the present invention.

As can be seen in the FIG. 6, the electro-hydraulic system 76, which serves to hydraulically actuate the vertically adjustable ambulance cot 2, comprises a power unit 78 having an electric motor 80, powered by battery 30 (FIG. 5), driving a pump 82 for supplying the hydraulic fluid from a reservoir 84, and a hydraulic control circuit 86. The power unit 78 is operable in two directions to supply hydraulic fluid from the reservoir 84 (through a respective filter 88 or 88' and respective pair of check valves 90, 98 or 90', 98') to either a first branch 92 or a second branch 94 of the control circuit 86. In the illustrated embodiment, check valves 98, 98' are pilot controlled check valves. Also as illustrated, the pump 82 is in fluid connection between the pairs of check valves 90, 90' and 98, 98' along with a back pressure circuit 95 provided upstream thereof. The backpressure circuit 95 ensures a more smooth and even movement of the hydraulic cylinders without a sharp jerking motion, and includes a spring-controlled unloading valve 96 and a low pressure relief valve 104. The low pressure relief valve 104 is set to relieve back pressures in excess of about 1,034 kiloPascals (about 150 psi).

In the first branch 92 of the control circuit 86, which extends from the power unit 78 to the extension side of the cylinders 72, 72', a high pressure relief valve 100 is positioned, which is set to relieve line pressures in excess of 13.8 MPa (2000 psi). Downstream from the high pressure relief valve 100 is positioned an adjustable compensating feed valve 102. The feed valve 102 provides a wide range of advance and retract feeds, thereby ensuring that the hydraulic fluid is provided to the cylinders 72, 72' in at a controlled and safe rate. However, a bypass check value 103 is provided around feed vale 102 to ensure that suitable fluid flow is provided to the extension side of the hydraulic cylinders 72, 72', thereby ensuring a smooth extension of cylinders 72, 72' when lifting under power a patient situated on the cot 10.

Additionally, the bypass check valve 103 ensures a vacuum does not form on the extension side of the hydraulic cylinders 72, 72' when manually raising the cot 2 which is explained more fully in a later section. The hydraulic cylinders 72, 72' are under power when the motor 80 is operated to supply fluid under pressure to the first branch 92 in order to extend the cylinders 72, 72', thereby raising the upper frame 12 of the cot 2 relative to the lower frame 14. In one embodiment, the rate of the hydraulic fluid supply to the first branch 92 from the power unit 78 is about 3 liters per minute (about 0.80 GPM).

In the second branch 94, which is parallel to said first branch 92 and which extends between the retraction side of the cylinders 72, 72' and the power unit 78, a high pressure relief valve 105 is positioned, which is set to relieve line pressures in excess of 13.8 MPa (2000 psi). Downstream from the high pressure relief valve 105 is positioned pilot controlled check valve 98'. The motor 80 is operated to supply fluid under pressure to the second branch 94 in order to retract the cylinders 72, 72', thereby lowering the upper frame 12 relative to the lower frame 14. In one embodiment, the rate of the hydraulic fluid supply to the second branch 94 from the power unit 78 is about 2.3 liters per minute (about 0.6 GPM).

Between the first branch 92 and the second branch 94, are located a pair of hand operated spring-return valves 106, 106', used to manually lower or raise the cot 2. The outlets of the hand-operated spring-return valves 106, 106' dump to the reservoir 84. A check valve 108, which flows only in the feed direction of the second branch 94, ensures a vacuum does not form on the bottom side of the hydraulic cylinders 72, 72' when manually lowering the cot 2 via operating the hand-operated spring-return valves 106, 106'.

Taking as an initial position of the cot 2 at the lowered position thereof, the pump 82 of the power unit 78 pumps the fluid into the first branch 92, through the associated pilot control check valve 98, to the pressure compensated feed valve 102 and through the bypass check value 103. It is to be appreciated that supplying hydraulic fluid to the first branch 92 also opens the check valve 98' in the second branch 94 to permit the hydraulic fluid to flow from the bottom of the cylinders 72, 72' back to the inlet of the pump 82.

When the pressure required for lifting the cylinders 72, 72' has been reached, the cylinders 72, 72' will be accelerated continuously and slowly until it has reached its maximum speed depending on the properties of the fluid flow and pressure drop. In the course of this process, the pressure in the first branch 92 up to the inlet of the feed valve 102 and through bypass check valve 103 will exceeds the pressure in the cylinders 72, 72' as the amount of fluid delivered by the pump 82 is larger than the maximum amount of fluid flowing through the feed valve 102 and bypass check value 103. Accordingly, the excessive amount of fluid in the first branch 92 is then discharged into the reservoir 84 by being dumped via feed valve 102. It follows that a constant lifting movement is carried out until the power unit 78 is switched off.

A short time after switching off the power unit 78, such as when reaching the desired level for the upper frame 12 of the cot 2, the pilot operated check valve 98 in the first branch 92 remains closed as long as the pressure at its inlet does not exceed the pressure in the cylinder or is opened by operating the power unit in the opposite direction. Hence, the cylinders 72, 72', are prevented from retracting. Exactly the opposite takes place in the second branch 94 when lowering the upper frame 12 by operating power unit in the reverse direction.

Figure 7:
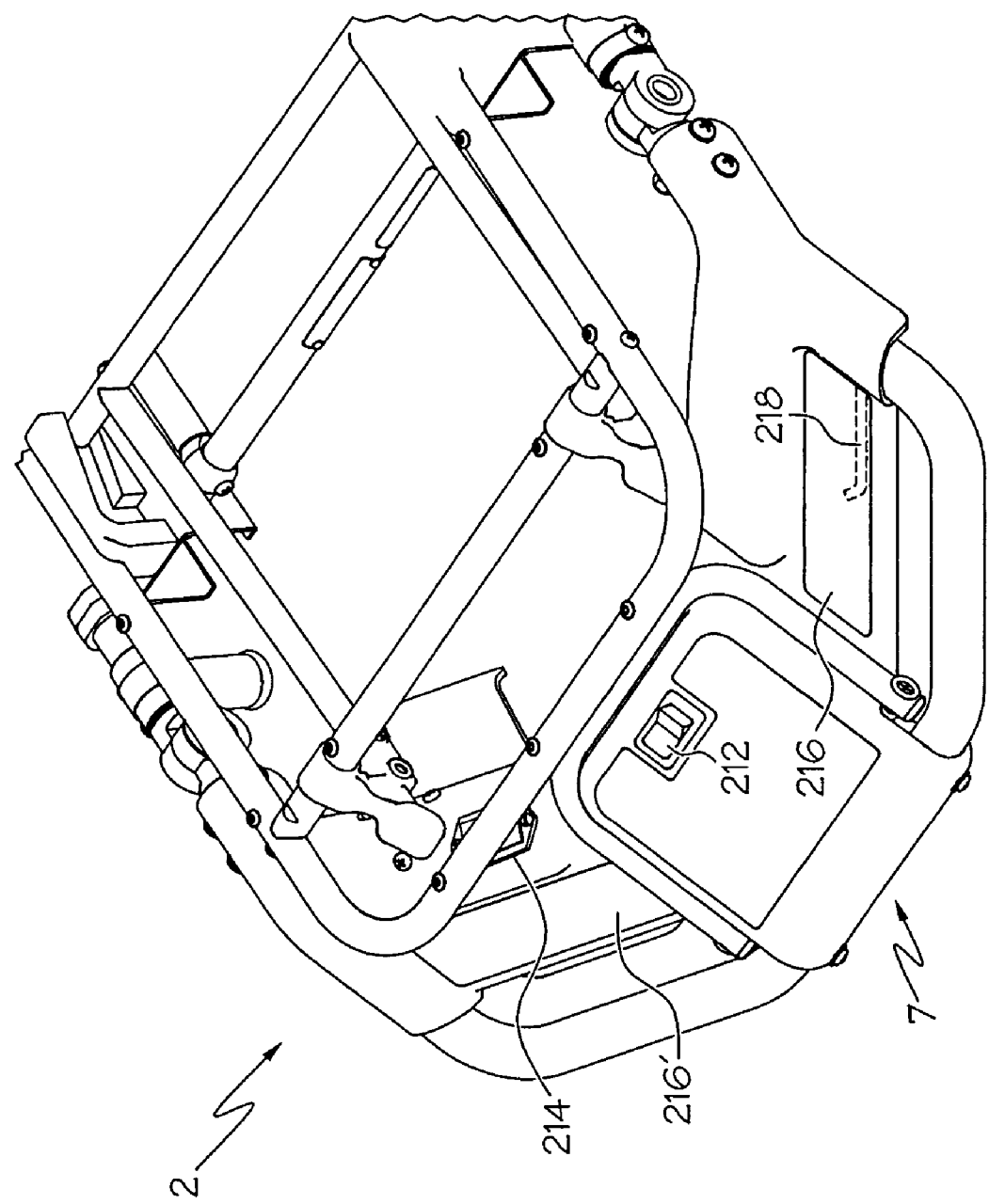
FIG. 7 is an illustrated close-up section view of a trailing (operator) end of a cot according to the present invention.

Turning to FIG. 7, an illustrated close-up section view of a trailing (operator) end 7 of the cot 2 according to the present invention is shown. As illustrated, the trailing (operator) end 7 of the cot provides the end frame member 22, which has a bent U-shape, and like the leading end frame member 18 (FIG. 3), is also a drop frame with a plurality of locking positions. It is to be appreciated that the trailing end frame member 22 can be raised or lowered with two hands, and along with its bent U-shape, thereby provides additional lifting points for better ergonomics and fewer injuries, and reduces overall length of the cot for easier maneuverability in confined spaces.

Provided to the trailing end frame member 22 is an on/off button 212 used to energize the motor 80 in the power unit 78 (FIG. 6) with battery 30 (FIG. 5). A battery charge indicator 214 is also provided, which indicates battery state of charge. Relatively large thumb control switches 216, 216' used to control the up and down operation of the cot 2, are also provided to the trailing end frame member 22. It is to be appreciated that the U-shape of the trailing end frame member 22 and the relatively large thumb control switches 216, 216', provide for a wide range of hand sizes and gripping points along the frame member 22, thereby making it easier for two operators to load the cot while both sets of hands are holding the cot from the trailing (operator) end 7. An actuator 218 for the manual operation mode of the cot 2 is also provided at the trailing (operator) end 7.

While the invention has been described by reference to certain preferred embodiments, it should be understood that numerous changes could be made within the spirit and scope of the inventive concepts described. For example, all relief valves may be variably adjusted, and that although in one embodiment the above mentioned pressures are suitable, other system pressures may be used without departing from the scope and spirit of the invention. Accordingly, it is intended that the invention not be limited to the disclosed embodiments, but that it have the full scope permitted by the language of the following claims.

The invention claimed is:

1. A charging system for recharging a battery with an electrical system of an emergency vehicle, said charging system comprising:

a first connector having at least one contact pad electrically contacted to the battery, wherein said first connector is situated on a powered cot carrying the battery, said powered cot having a lift system and an electrical circuit configured to disable said lift system when the battery is electrically connected to the electrical system and charging via said charging system; and a second connector having at least one prong configured to be contactable with said at least one contact pad, said at least one prong when contacting said at least one contact pad completes an electrical circuit which connects the battery to the electrical system of the emergency vehicle, wherein said second connector is removably mounted to the emergency vehicle.

2. The charging system of claim 1 further comprising a power cord coupled to said second connector at a first end and removably connectable to said electrical system at a second end thereof.

3. The charging system of claim 1 wherein the prong is moveable.

4. The charging system on claim 1 wherein the prong is spring biased in an extended position.

5. The charging system of claim 1 further comprising a power cord removably coupled to said second connector at a first end and removably connectable to said electrical system at a second end thereof.

6. The charging system of claim 1 wherein said first connector has a first side with a first shape, and said second connector has a second side with a shape complimentary to said first shape.

7. The charging system of claim 1 wherein said first connector has a first side with a first shape, said second connector has a second side with a shape complimentary to said first shape, said at least one contact pad is provided on said first side, and said at least one prong is provided on said second side.

8. The charging system of claim 1 wherein further comprises a disconnect switch to decouple said at least one prong from the electrical system when said at least one prong is not in contact with said at least one pad.

9. The charging system of claim 1 wherein said first connector has a first side with a first shape, said second connector has a second side with a shape complimentary to said first shape, said at least one contact pad is provided on said first side, said at least one prong is provided on said second side, and said first shape is trapezoidal.

10. The charging system of claim 1 wherein said first connector is situated on a powered cot carrying the battery.

11. The charging system of claim 1 wherein said first connector is situated on a powered cot carrying the battery, and said second connector is removably mounted to the emergency vehicle.

12. The charging system of claim 1 wherein said first connector is situated on a powered cot carrying the battery, and said second connector is mounted to a securing device of the emergency vehicle.

13. The charging system of claim 1 further comprising a charger, a power cord coupled to said second connector at a first end and removably connectable to said charger at a second end thereof, a DC/AC power inverter coupled to said charger at one end and the electrical system at another end thereof.

14. The charging system of claim 1 further comprising a charger, a power cord coupled to said second connector at a first end and removably connectable to said charger at a second end thereof, a DC/AC power inverter coupled to said charger at one end and the electrical system at another end thereof, said charger optionally receiving AC power from an external AC power supply instead of from said electrical system through said DC/AC power inverter.

15. The charging system of claim 1 wherein further comprises a disconnect switch to decouple said at least one prong from the electrical system when said at least one prong is not in contact with said at least one pad, said disconnect switch being selected from the group consisting of mechanical disconnect switches and magnetic disconnect switches.

16. The charging system of claim 1 wherein said battery is lead acid based.

17. A method of charging a battery of a powered lift cot using a charging system according to claim 1.

18. A method of charging a battery of a powered cot having a lift system using a charging system according to claim 1, said method further comprising automatically preventing operation of said lift system whenever said battery is being charged by said charging system.

19. An emergency vehicle, comprising:

an electrical system;

a powered cot having a lift system powered by a battery and an electrical circuit configured to disable said lift system when the battery is electrically connected to the electrical system and charging via said charging system; and a charging system for recharging the battery with the electrical system, said charging system having a first connector having at least one contact pad electrically contacted to the battery, wherein said first connector is situated on said powered cot carrying the battery, and a second connector removably mounted to the emergency vehicle having at least one prong configured to be contactable with said at least one contact pad, said at least one prong when contacting said at least one contact pad completes an electrical circuit which connects the battery to the electrical system of the emergency vehicle.

* * * * *